June 15, 1965
A. M. LE LAN
3,188,896
TRACER MACHINE-TOOL
Filed July 3, 1962
4 Sheets-Sheet 4
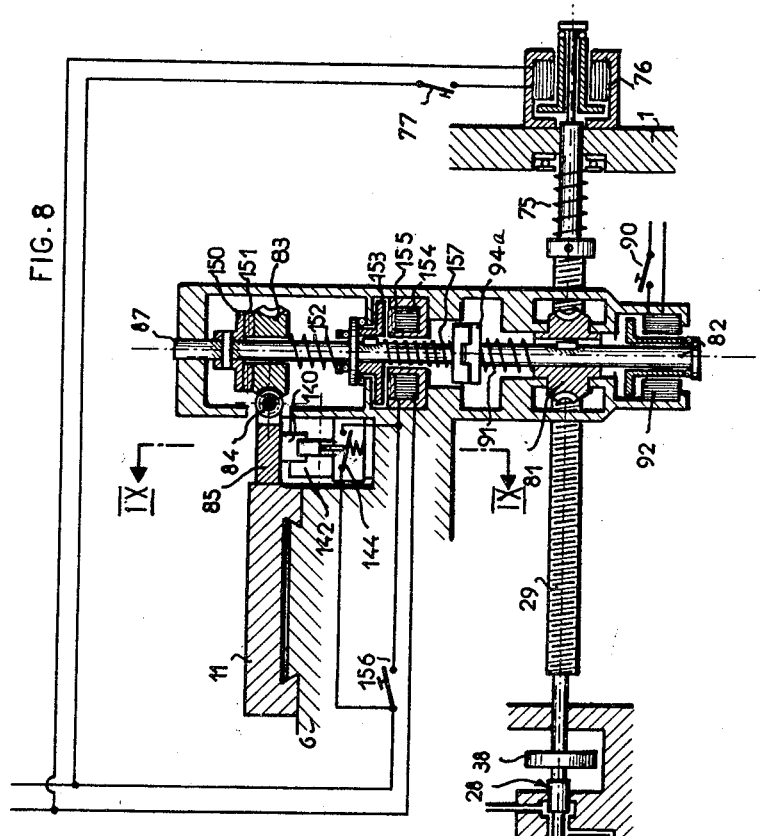
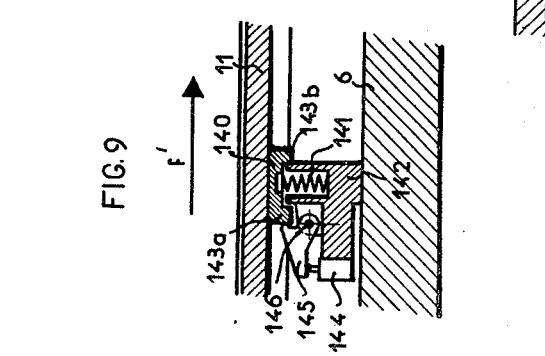

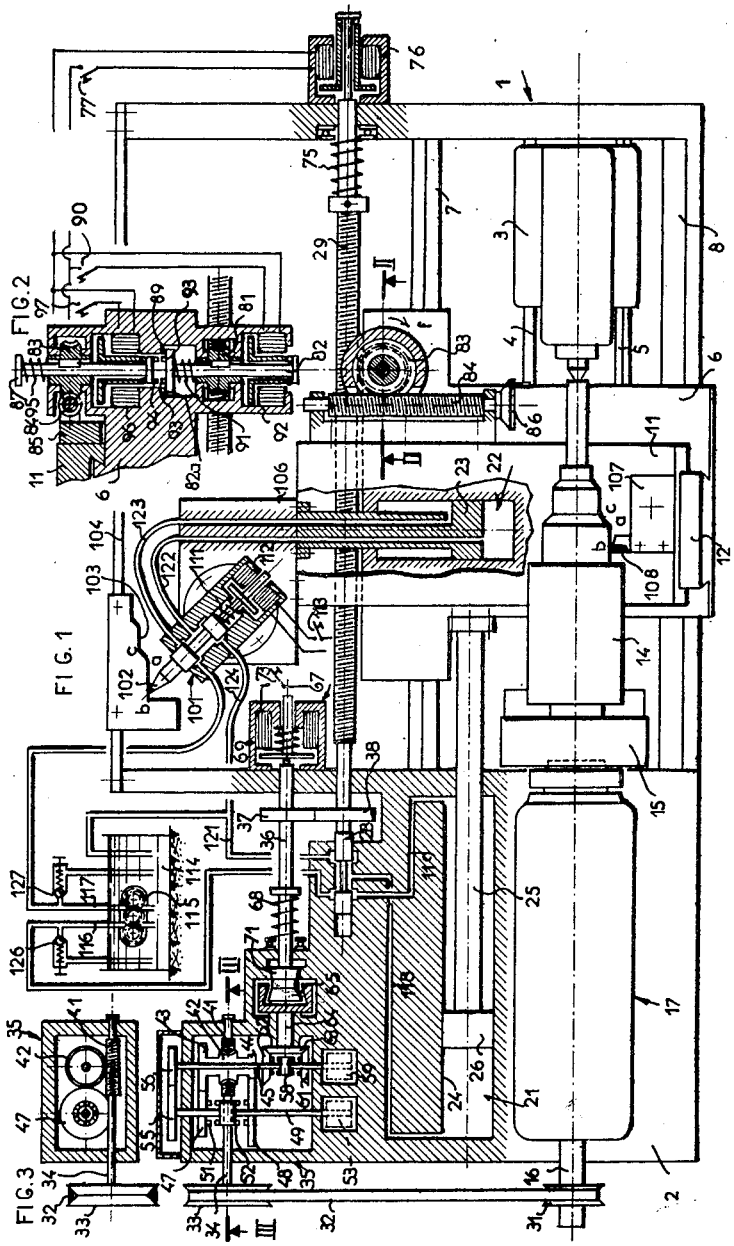

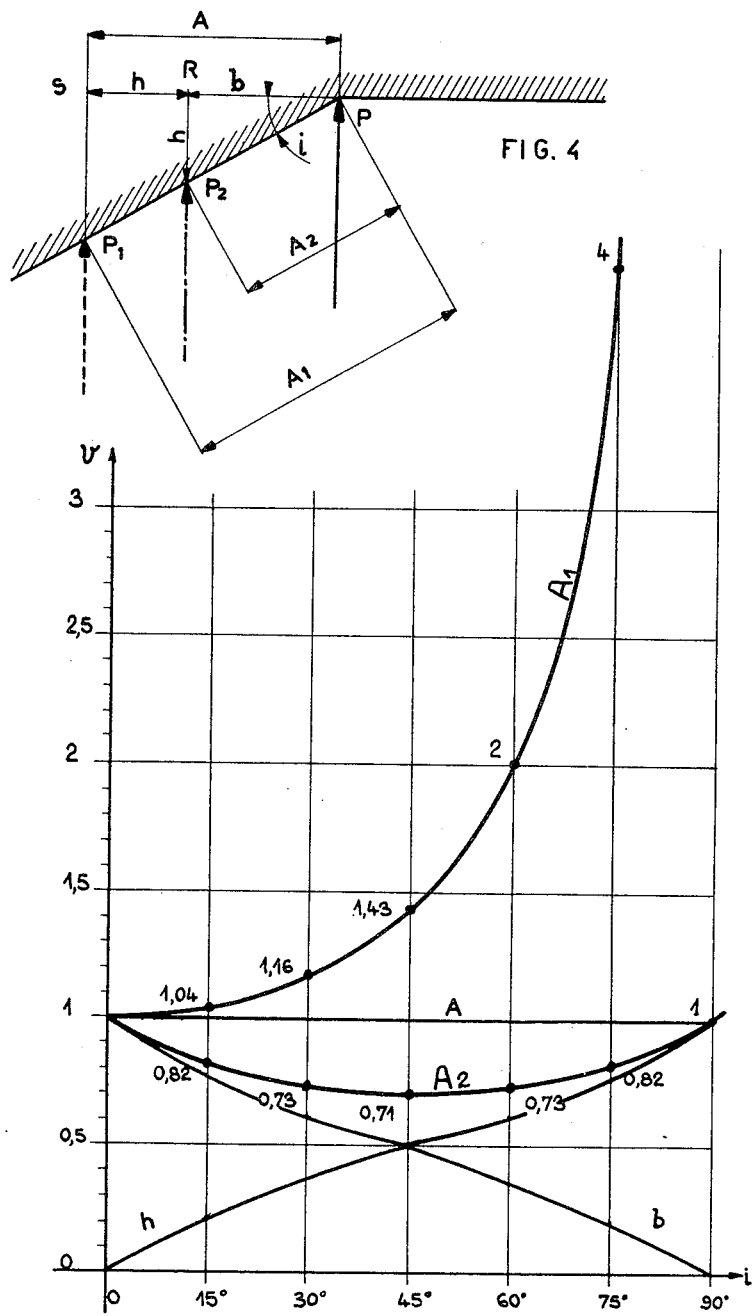

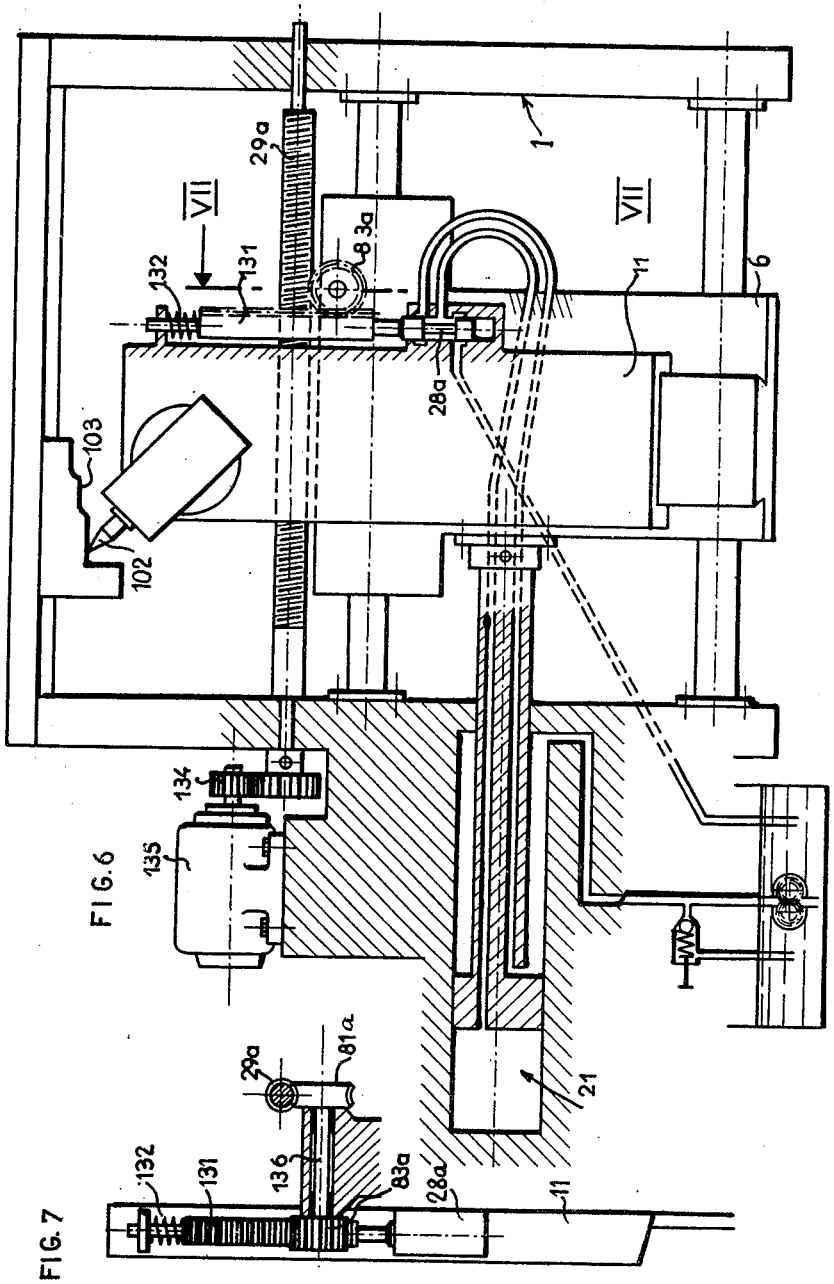

United States Patent Office 3,188,896
Patented June 15, 1965

3,188,896
TRACER MACHINE-TOOL
Armand Marcel Le Lan, Vanves, France, assignor to H. Ernault-Batignolles, Paris, France, a company of France
Filed July 3, 1962, Ser. No. 207,361
Claims priority, application France, Oct. 27, 1961, 877,180; Apr. 25, 1962, 895,492
5 Claims. (Cl. 82—14)

This invention relates to tracer machine-tools of the type including lathes, milling-cutters, torch cutting-machines, and other machines in which the relative motion of a tool with respect to the work is effected under control of a feeler tracingly engaging the contour of a pattern so as to cause the tool to reproduce said contour on the surface of the work.

It is an object of the invention to provide improved, positively-acting means for maintaining the effective velocity of the tool relative to the work approximately constant despite large angular variations in the pattern contour being traced.

The problem with which the invention is concerned will be explained with particular reference to a slide lathe, but it will be evident that a similar problem arises in connection with any other tracer machine.

Considering a slide lathe, this generally comprises a first member, or carriage, slidable on a bench in a first, longitudinal, direction, and a second member, or slide, slidable on the first member in a second, transverse, direction. The slide in turn carries a cutting tool engageable with a workpart revolving on a longitudinally extending spindle. The carriage is moved in the first direction at a rate, called the longitudinal feed rate, which is usually constant, while the slide is moved in the second direction towards and away from the work (crossfeed movement) in response to the movements of a feeler carried by the slide and engaging the contour of a pattern mounted on the bench.

With an arrangement as just described, it is obvious that for a constant longitudinal feed velocity, the crossfeed velocity, i.e. the velocity of the slide and tool in the second or transverse direction, depends not only on the value of the longitudinal feed velocity but also on the angular direction of the pattern contour being traced at any particular time with respect to the longitudinal direction. When the pattern contour angle increases, the crossfeed velocity also increases. The effective velocity of the tool relative to the work is the vector resultant of the longitudinal feed and crossfeed velocities, and when the contour slope angle increases this resultant also increases, so that the effective velocity is liable to assume inordinately high values. Theoretically the resultant is infinite for a 90° slope angle, i.e. a perpendicular cut in the work. The increase in effective or cutting velocity has an adverse influence on the quality of the machined part. To obviate this, it is necessary to reduce the longitudinal feed velocity by an amount proportionate with the crossfeed velocity component whenever such component is present due to a sloping portion of the contour being traced.

The problem thus set forth, has been known for very many years and has already received various solutions in the prior art. Thus, in an early type of copying lathe, wherein the feeler and tool are both rigidly mounted on the crossfeed slide so that the crossfeed movement was imparted to the slide and tool exclusively through the reaction of the feeler against the pattern contour, and the longitudinal feed was imparted by rotation of a leadscrew threadedly engaging a nut attached to the carriage, it has been known to mount said nut for longitudinal sliding movement relatively to the carriage and to secure the nut to a longitudinal rack meshing with a first gear rotatable with a second gear meshing with a second transverse rack supported on the slide, both gears being mounted on a shaft freely rotatable on the carriage. With such an arrangement, whenever the feeler was urged in a transverse direction by a sloping contour portion of the pattern, so that a crossfeed component was present, the gears would be rotated and the lead nut displaced a corresponding amount relative to the carriage, so that the effective longitudinal feed velocity of the carriage would be reduced by a corresponding amount. However, in such a system the full reaction force developed by the work against the tool is transmitted to the point of engagement between the feeler and pattern, so that the overall operation of the machine was very poor.

In another known arrangement in which the feed movement in a lathe is produced by a hydraulic actuator rather than a lead screw, the corrective displacements were imparted to the actuator cylinder relative to the carriage. This arrangement is subject to exactly the same defects as the one just descibed. These defects can only be overcome by providing a tracer machine-tool in which the longitudinal and crossfeed movements are imparted by separate servo-systems.

Tracing machine tools have been proposed, in which the feeler following the pattern contour is arranged to deliver an electric control signal representing the instantaneous value of the reaction force between the feeler and pattern, and such control signal is applied to electrically operated servo-motors (electric or hydraulic in character) to produce the longitudinal and crossfeed movements. In one such prior proposal, embodying hydraulic servo-motors, the electric signal was used to insert a variable resistance into the hydraulic flow circuit of the longitudinal feed servo-motor, thereby reducing the longitudinal feed rate whenever a cross feed component is present. In another proposal, using electric servo-motors, the electric feeler signal was electrically subtracted from a constant signal to provide the control signal that was applied to the longitudinal feed motor. Such arrangements are clearly inapplicable to tracer machines using mechanically acting feelers which have important advantages, as to simplicity and ruggedness. There is, therefore, a demand for a tracer machine-tool having separate longitudinal and crossfeed servo systems and provided with an efficient and precise mechanical corrective arrangement whereby the presence of a crossfeed velocity component will reduce the longitudinal feed velocity component by a corresponding amount. It is an object of this invention to provide such a machine-tool.

In U.S. Patent 2,601,157, there is described a machine tool in which the means for imparting longitudinal feed displacement comprises a complex servo-system including a lead screw rotatable in the frame and threadedly engaging the longitudinal machine carriage, and a fluid actuator connected for displacing said carriage, the lead screw being rotated at a substantially uniform velocity by power means, and a gear being rotatably mounted on the carriage for meshing engagement with the lead screw, means being provided whereby any departure of the longitudinal feed rate from a preselected base value would cause a relative displacement between the lead screw and gear, which relative displacement is operative to actuate the controlled value of the actuator to restore the preselected feed rate. It is a further object of this invention to provide a tracer machine-tool of this character, embodying means for causing further corrective displacements for actuating the controller valve of the actuator whenever a crossfeed velocity component is present, so as to reduce the longitudinal feed velocity component by a corresponding amount from its preselected base value.

Further objects, as well as the novel features of the invention, will appear from the ensuing disclosure relating to specific embodiments of the invention, given by way of example but not of limitation, and illustrated in the accompanying drawings, wherein:

FIG. 1 is a plan view, partly in simplified section and partly schematic, of a first embodiment of a tracer or copying lathe according to the invention;

FIG. 2 is a fragmentary vertical section on line II—II on FIG. 1;

FIG. 3 is a fragmentary vertical section on line III—III of FIG. 1;

FIG. 4 is a chart illustrating geometric relationships between the longitudinal and crossfeed components in the case of a sloping portion of the pattern contour being traced, in a machine-tool according to the invention;

FIG. 5 is a graph showing the variation curves of the longitudinal, crossfeed and resultant effective velocities plotted against contour slope angle, in a machine according to the invention;

FIG. 6 is a plan view generally similar to FIG. 1 but with certain details simplified and others omitted for clarity, and relating to another embodiment of the invention;

FIG. 7 is a partial vertical section on the line VII—VII of FIG. 6;

FIG. 8 illustrates in simplified plan cross section part of an improved machine-tool of a general lay-out similar to FIG. 1 but embodying certain modified features according to the invention; and FIG. 9 is a partial cross section on the line IX—IX of FIG. 8.

Referring to FIGS. 1 to 3, the slide lathe shown comprises a bench or frame generally designated 1, on which are supported a stationary headstock 2 and a movable tailstock 3 slidable on ways 4 and 5 of the frame. A carriage 6 is supported for longitudinal feed displacement along ways 7 and 8 parallel to ways 4 and 5. A crossfeed block or slide 11 is further supported on ways 12 across the carriage 6, normally to the axis of the input shaft 16 driven from a motor (not shown). The headstock 2 has a suitable transmission 17, preferably with several speed changes therein, which is driven from shaft 16.

A workpiece 14 is shown as supported at one end from a centre piece on the tailstock 3, and at its other end from a chuck 15 mounted on the work spindle which is driven from the transmission in the headstock 2 in any suitable manner.

Longitudinal feed displacement of the carriage 6 along the ways 7, 8 of the bench is produced by means of a differential-type hydraulic actuator 21, and transverse displacement of crossfeed of the slide 11 along the ways 12 on the carriage is produced by another hydraulic actuator which comprises a cylinder 22 formed in carriage 6, and a differential piston 23 slidable in cylinder 22 and connected to a tracer valve support 106 carried by cross slide 11. The longitudinal feed actuator 21 includes a cylinder 24 shown as forming part of headstock 2, and a differential piston 26 reciprocable in said cylinder and having a piston rod 25 extending from it and attached to the carriage 6.

Feed actuator 21 is controlled by way of a conventional spool valve 28. As schematically shown herein, said valve includes a valve bore in which a valve spool with two spaced lands is slidable. Two axially spaced circumferential grooves formed in the surface of the bore and constituting an inlet and an outlet groove are respectively connected with a fluid supply line extending from the delivery 116 of a pump 115 described later, and with a fluid exhaust line 121 leading back to a sump 114 from which said pump draws liquid. The end of cylinder 24 on the smaller-area side of the differential piston 26 is connected by a duct 119 with the inlet groove, while the end of cylinder 24 on the larger-area side of the differential piston is connected by a duct 118 with a point of the valve bore between the inlet and outlet grooves. Thus, in accordance with the well-known operation of such differential actuator systems, displacement of the valve spool of valve 28 in either sense away from its neutral position, in which equal forces are applied to the opposite faces of differential piston 26, will result in a displacement of the piston 26 in one direction or the other.

To produce the shifting displacements of the valve spool 28, said spool is secured integrally to a projecting end of a lead-screw shaft 29 journalled for rotation in the frame, and also for limited axial dipslacement in order to permit the said shifting displacements of the valve spool. Leadscrew 29 threadedly engages a nut portion of carriage 6.

Leadscrew 29 is rotated from the lathe spindle 16 through a drive transmission including a V-belt pulley 31 secured on the spindle 16, a V-belt 32 trained about pulley 31 and another pulley 33 secured on the input shaft 34 of a gearbox generally designated 35, gearbox output shaft 36, a gear 37 secured on shaft 36, and a further gear 38 meshing therewith and secured on leadscrew 29. Gearbox 35 includes a worm 41 secured on input shaft 34, a wormgear 42 meshing with the worm, a pair of gears 43, 44 secured to the wormgear and rotatable therewith about an intermediate shaft 45, two gears 47, 48 meshing with gears 43, 44 respectively and both mounted on a further intermediate shaft 49, either of the gears 47, 48 being selectively engageable with shaft 49 by means of a pair of dog clutches 51, 52 respectively controlled through a solenoid unit 53; a gear 55 secured to shaft 49, a gear 56 meshing therewith and secured to shaft 45, a dog clutch 58 rotatable with shaft 45 and slidable thereon by selective energization of a solenoid unit 59 so as to be engageable with either one of two bevel gears 61, 62 both meshing with a third bevel gear 63 secured on a shaft 64, and a clutch 65 schematically illustrated, and operable to engage shaft 64 with the output shaft 36 of gear box 35 when shaft 36 is displaced axially in the rightward direction as shown in FIG. 1 through energization of a solenoid unit 67. A spring 68 biasses shaft 36 rightwards i.e. towards engagement of clutch 65, while a spring 69 stronger than spring 68 and disposed within the solenoid unit 67 biasses shaft 36 in the direction to disengage the clutch 65. On unit 67 being energized, spring 69 is compressed and spring 68 acts to engage clutch 65. When unit 67 is deenergized, the spring 69 displaces shaft 36 and blocks it against rotation through engagement of another schematically illustrated clutch 71, having one element secured to shaft 36 and its other element secured to the headstock 2 of the lathe, so as to produce an immediate blocking of the pilot lead-screw 29 against rotation. Reference 73 schematically designates a switch for controlling the energizing circuit of solenoid device 67.

The lead screw 29 is biassed in the leftward axial direction (according to FIG. 1) by a spring 75, and is displaceable in the opposite direction by a solenoid unit 76 when energized through closure of a switch 77.

Means are provided whereby crossfeed displacements of slide 11 impart corrective displacements to the spool of valve 28 to alter the axial position thereof. The lead screw 29 to which said valve spool is attached meshes with a gear 81 (visible in FIG. 2) secured on a vertical shaft 82 rotatably mounted on the carriage 6. A further gear 83 coaxial with gear 81 and of equal radius thereto in the embodiment shown is mounted on a shaft 87 coaxially aligned with shaft 82 and normally coupled for rotation therewith through a clutch coupling later described, said gear 83 meshing with a worm 84 extending normally to screw 29 and rotatably mounted in brackets 85 carried by slide 11. The worm 84 is prevented from axial displacement relatively to the slide, but is rotatable relatively thereto, and can be rotated manually through a desired angle by means of a hand-wheel 86 secured to the worm, for manually presetting the initial position of the slide on the frame.

The shaft 82 is secured for rotation with gear 81 but is axially displaceable relative to said gear, and similarly shaft 87 is slidable, but non-rotatable, relative to gear 83.

Shaft 82 carries a dog-clutch member 82a engageable with a dog clutch member 89 secured to slide 6. A spring 91 biasses shaft 82 axially in a direction to engage clutch members 82a and 89 (upwards in FIG. 2), so as to block shaft 82 and gear 81 with respect to the slide. A solenoid unit 92 is energizable by closure of a switch 90 to urge shaft 82 in the opposite axial direction (downwards in FIG. 2) to disengage the dog clutch means 82a–89 and release gear 81.

Shaft 82 further carries a dog clutch member 93 engageable with a dog clutch member 94 secured to shaft 87. A spring 95 urges shaft 87 in an axial direction (upward in FIG. 2) to disengage the clutch members 93–94, while a solenoid unit 96 is energizable by closure of a switch 97 to displace shaft 87 in the opposite axial sense (downward) to engage clutch 93–94 and simultaneously disengage clutch members 82a–89 thereby releasing shaft 82 from carriage 6 and coupling it with shaft 87. It is noted that solenoid unit 96 generates sufficient force to overcome the combined action of both springs 95 and 91. The purpose of this arrangement will appear later.

The transverse displacement or crossfeed actuator 22 displacing the slide 11 relatively to carriage 6, is controlled by means of a valve 101 of a general type similar to valve 28 described above, the valve spool of which is secured to a feeler 102 projecting therefrom into engagement with the contour of a pattern plate 103 mounted on a pattern holder 104 mounted on the frame 1 of the lathe. As shown, the valve unit 101 with its attached feeler 102 is mounted at an angle of about 45° relative to the directions of longitudinal and transverse movements of the machine. Valve unit 101 is mounted on a support 106 secured to slide 11. Also mounted on the slide is a tool holder 107 carrying a cutting tool 108 engageable with the workpiece 14 to reproduce thereon the contour of pattern plate 103. The spool of crossfeed control valve 101 is biassed by a spring 111 in the direction to engage the feeler 102 with the pattern plate 103. It will be noted from FIG. 1 that the arrangement is such that an axial shifting of feeler 102 and spool of valve 101 outwardly of the valve casing by the force of spring 111, when permitted by the pattern contour, applies fluid pressure from the delivery line 117 of pump 115 through line 122 into the lower chamber of actuator 22 on the larger-area side of differential piston 23, and that the resulting displacement of piston 23 in the actuator cylinder displaces the slide 11 in a direction (upward in FIG. 1) to engage the tool 108 deeper into the workpiece 14; conversely, when the feeler 102 is pushed inwardly of the valve casing by the reaction of the pattern contour 103, the valve spool tends to connect the exhaust line 124 with the line 122 leading to the lower, larger-area chamber of acuator 22, and the slide 11 is then displaced (downward in the drawing) to disengage tool 108 out of the workpiece 14. Thus the tool is enabled to follow a path relative to the work 14 which reproduces the path followed by the feeler 102 along the pattern contour, to cut the desired contour on the work.

A solenoid unit 112 is energizable by closure of a switch 113 to retract the spool of valve 101 in opposition to spring 111 and in a direction and by an amount sufficient to produce a rapid rearward displacement of the slide as for disengaging the tool from the work and returning the slide towards its initial position.

It will be noted that the pump 115 powering the system is herein shown as a dual gear pump, and that its twin delivery lines 116 and 117 have pressure-limiting by-pass valves 126, 127 associated therewith.

The system described operates as follows:

The input shaft 16 of the lathe and with it the work 14 are set into rotation at a suitable high speed from the motor means, not shown, through transmission 17. Gearbox 35 is preset to a gear ratio corresponding to the desired sense and value of a selected longitudinal base feed rate. Switch 73 is closed to energize solenoid 67 for engaging clutch 65 and rotating lead screw 29. Switch 97 is closed to energize solenoid 96 and engage the clutch 93—94 and disengage clutch 82a—89, thereby connecting gear 83 for rotation with gear 81 while releasing shaft 82 from carriage 6. Pump 115 is operated continuously to supply pressure to the inlet grooves of both control valves 28 and 101.

Assuming the feeler 102 is engaging a straight portion $b$–$a$ of pattern 103 parallel to the direction of slideways 7, 8 of carriage 6, then the spool of crossfeed control valve 101 remains stationary during the longitudinal feed displacement and the differential piston 23 of the crossfeed actuator 22 remains stationary relative to carriage 6, so that slide 11 and worm 84 also retain fixed positions relative to the carriage. As a result gear 83 meshing with worm 84, and gear 81 rotatable with gear 83, retain angularly fixed positions relative to carriage 6. In these conditions, the gear 81 being locked against rotation by reaction of gear 83 against worm 84 as long as the latter is not moved relative to carriage 6, the rotating lead screw 29 moves valve 28 longitudinally from its neutral position in the leftward direction relative to gear 81 so as to progressively increase the liquid pressure acting on the larger face of piston 26 until carriage 6 is displaced by piston 26 in the rightward direction at such a speed as to stop said longitudinal movement of valve 28, as this has been explained in Patent 2,601,157 mentioned above. At the same time, any departure of the longitudinal feed rate from the preselected base value will cause gear 81 to shift the lead screw so as to impart a corrective displacement to the spool of valve 28, until the desired feed rate has been restored. Thus it is seen that the lead screw 29 may be considered as a mechanical feedback connection of the longitudinal feed control servosystem, serving to provide velocity stabilization.

When on the other hand feeler 102 is engaging an inclined portion such as $a$–$c$ of pattern contour 103, e.g. at a time after the engagement of the feeler with section $a$–$b$, then the reaction of the pattern contour on the feeler causes an outward movement of the spool of valve 101 from its casing to thereby increase the rate of liquid flow through line 122 to the larger face of piston 23, thus causing the slide 11 to move relatively to carriage 6 in a direction (upward in FIG. 1) corresponding to the work stroke of tool 108. This movement of slide 11 carries the worm 84 with it, imparting an axial movement to said worm relative to carriage 6, so that gear 83 is rotated in the direction indicated by arrow $f$. Gear 81 is rotated simultaneously in the same direction, and by the same amount, imparting a small axial displacement to lead screw 29 and hence to the spool of longitudinal feed control valve 28, in a direction tending to oppose the feed displacement of carriage 6. Thus the rate of longitudinal feed is reduced, by an amount corresponding to the instantaneous rate of the crossfeed displacement of slide 11. The effective cutting velocity of the tool 108 relatively to the work 14, along the portion $a$–$c$ of the contour, is therefore the geometrical resultant of the crossfeed displacement rate vector and a vector equal to the longitudinal base feed rate minus the crossfeed displacement rate.

While this relationship does not result in a strictly constant cutting velocity of the tool regardless of the angle of the contour section being cut, said cutting velocity departs but little from a constant value, and such departures remain within permissible limits even for large slope angles of the contour to the axis of feed, in contrast with the conditions that would arise under similar circumstances in the absence of the mechanical cross-connection between the transverse and longitudinal displacement rate control means according to the invention, when the crossfeed displacement rate would tend to assume intolerably high values.

It is noted that the arithmethic sum of the transverse and effective longitudinal displacement rates of the slide is strictly uniform, being equal to the preselected longitudinal base feed rate as determined exclusively by the rate of rotation of the lead screw 29.

When a contour portion parallel to the lathe spindle axis is being cut, the crossfeed displacement rate is zero and the effective longitudinal feed rate is equal to the selected base feed rate. In the other extreme, i.e. when cutting a contour section normal to the axis, the feeler and tool are displaced in the transverse direction at the maximum crossfeed rate attainable, i.e. the longitudinal base feed rate, while the effective longitudinal feed rate of the slide is zero.

For any intermediate angle of the contour being cut, the crossfeed and the effective longitudinal rates assume intermediate values such that their arithmetic sum always equals the preselected base feed rate.

The above will be further clarified by reference to FIGS. 4 and 5. In the graph of FIG. 5, the curve $A_2$ indicates the variations of the effective cutting velocity of the tool, plotted in ordinates in arbitrary units, against the slope angle $i$ of the pattern contour being scanned by the feeler to the longitudinal feed direction. It will be noted that when the slope angle $i$ varies from 0 to 90°, the effective cutting velocity departs relatively little from a constant value as indicated by the horizontal A. The curve $A_2$ was plotted as follows (also see FIG. 4).

A being the preselected base feed rate, then in the case of an inclined pattern contour section such as P–P1 (FIG. 4) the effective longitudinal displacement is represented by the distance PR, designated $b$, while the transverse displacement is measured by distance RP2, or $h$. By the inherent operation of the machine, the length RS is equal to RP2 or $h$, since the sum of the effective longitudinal displacement PR plus transverse displacement RP2 is at any time equal to the base feed displacement A. The resultant effective displacement of the tool in the direction of the contour is equal to PP2. Since we have the obvious relations:

$$h = A_2 \sin i, \quad b = A_2 \cos i$$

and $$h + b = A_2 (\sin i + \cos i) = A$$

the effective or resultant displacement is given by $$A_2 = \frac{A}{\sin i + \cos i}$$

The values of $A_2$ computed from the above relation have been plotted in FIG. 5 for angular values $i$ differing in 15° increments over the range 0–90°. Thus, for a slope angle $i = 45°$, $A_2$ is a minimum, being equal to 0.71 times the base feed rate.

For a given base feed rate A of constant value, the effective cutting velocity of the tool is never greater than that value, whereas in conventional machines wherein the effective longitudinal feed rate of the carriage was generally held constant, the transverse velocity was forced to assume inordinately large values in an attempt to follow the inclined or sloping portions of the pattern contour, as indicated by curve $A_1$ of FIG. 5. Curve $A_1$ is represented by the equation $$A_1 = \frac{A}{\cos i}$$

and shows that in the conventional construction, for a slope angle of 60°, the resultant cutting speed $A_1$ of the tool was twice the base feed rate, since $$\frac{1}{\cos 60°} = 2$$

and for a slope angle of 75°, the cutting speed would be nearly four times the base feed rate. In cutting a 90° angle or shoulder the effective cutting velocity would be theoretically infinite.

It will be noted that the dog clutch arrangement for selectively connecting the gears 81 and 83 and the carriage 6 serves inter alia the following purposes:

(1) If it is desired to cut a considerable length portion of work piece 14 parallel to the axis thereof, or generally to eliminate any influence of the displacements of slide 11 upon the longitudinal displacements of the carriage. Switch 97 is opened, whereupon spring 91 acts to engage the dog clutch teeth 82a of shaft 82 with the dog clutch teeth 89 of the carriage, thereby blocking shaft 82 and gear 81 relatively to the carriage while spring 95 displaces shaft 87 upwardly and disengages clutch member 94 secured thereto from clutch member 93 secured to shaft 82. In this condition rapid displacements can be imparted to slide 11, both in the tool-engaging direction by opening switch 113 to enable spring 111 to act on the control valve 101, and in the tool-retracting direction by closing switch 113 to cause solenoid 112 to retract the spool of valve 101 against spring 111.

The operation just described is of especial advantage at the beginning of a machining operation to cause a rapid approach of the tool to the work and on completion of the operation to cause a rapid retraction of the tool away from the work.

(2) Rapid return and rapid advance of the carriage can be effected as follows: Opening switch 97 to de-energize solenoid 96 and disengage the clutch member 94 on shaft 87 from clutch member 93 on shaft 82, and closing switch 90 to energize solenoid 92 and thereby completely release shaft 82 and gear 81 thereon. Thereafter, closing switch 77 to energize solenoid 76 to displace the valve 28 will cause a rapid return of the carriage 6 to initial position.

In the modified embodiment of FIGS. 6 and 7, components corresponding to those of FIGS. 1–3 have been designated by the same numerals and will not be described anew. The main difference over the first embodiment is that the lead screw 29a is prevented from axial sliding displacement relative to the frame, and the longitudinal feed control valve 28a is carried by a rack member 131 mounted on the slide 11 for displacement relative thereto parallel to the direction of displacement of the slide on the carriage 6. Rack 131 meshes with a gear 83a secured to the gear 81a meshing with the lead screw 29a. A biassing action is provided by a spring 132 urging rack 131 in one direction relative to slide 11.

FIG. 6 is a simplified view in which many of the details have been omitted, such as the hydraulic means for controlling transverse displacement of the slide relatively to the carriage, and other details have been shown schematically, including the means for rotating the lead screw 29a by way of a gear train 134 from electric motor 135. Such details may be largely similar to those shown more completely in FIGS. 1–3. Also, in this embodiment both gears 83a and 81a are shown permanently secured to a common shaft 136. The general operation of this system is the same as that of the first embodiment, except for the fact that since the longitudinal control valve 28a is carried by the slide, it is movable relatively to the frame of the machine rather than being stationary thereon. This merely results in a displacement of the points to which the control forces are applied during the operation of the machine, but the net result is exactly the same insofar as the relative values of the feed and crossfeed displacement rates are concerned.

FIG. 8 illustrates part of the components of the lathe shown in FIGS. 1–3, designated by the same reference numbers, and including the carriage 6 to which longitudinal feed displacements are imparted relative to frame 1 through a servo-system including lead screw 29 cooperating rackwise with the gear 81. The crossfeed slide 11 is displaced by way of a servo-system not shown in response to the motions of a feeder along a pattern contour. The slide 11 carries worm 84 cooperating with gear 83 for initial manual pre-setting purposes.

As in the first embodiment, gear 81 is secured for rotation with shaft 82 which is adapted to be coupled for rotation with shaft 87 aligned with it and having gear 83 mounted on it, by way of a dog clutch device 94a which can be disengaged by energization of a solenoid 92 through closure of a switch 90. Gear 83 is freely rotatable on shaft 87 and is permanently coupled with it by way of a friction clutch comprising a disk 151 having opposed friction surfaces engageable with a plate 150 secured to shaft 87 on one side and an end face of gear 83 on the other side, a spring 152 serving to bias the friction clutch assembly towards its engaged position.

The force of spring 152 and characteristics of the friction clutch are so predetermined that the torque transmitted through it is high enough to compress the spring 75 biassing the longitudinal feed control lead screw 29.

The shaft 87 is selectively blockable with respect to carriage 6 by way of a braking arrangement adapted to develop a braking torque higher than the torque transmissible through friction clutch 151. In this example, an electromagnetic brake arrangement is used, comprising a plate 153 connected for rotation with and for axial displacement relative to shaft 87 and cooperating with a stationary armature plate 155 secured to carriage 6 and controlled by a winding 154 energized from any suitable source by way of a circuit having two switches 156 and 144 connected therein in parallel. Switch 156 is manually operable while switch 144 is automatically operated in response to displacement of slide 11 with respect to carriage 6 in a way now to be described.

Switch 144 shown as a microswitch is mounted on a bracket 142 secured to carriage 6. Bracket 142 also supports a slider shoe 140 resiliently pressed against the surface of slide 11 by a spring 141 and adapted for free sliding displacement in either direction relative to the slide 11 parallel to the displacement of slide 11 on carriage 6, and over a very short distance, as determined by opposite stops 143a and 143b, of slide shoe 140 engageable with outer surfaces of bracket 142. Shoe 140 is adapted to actuate the actuator button of microswitch 144 through a motion-amplifying lever 145 mounted on a pivot 146 carried by bracket 142. The operation of the device is as follows:

Assume the lathe is to machine a part including an outwardly tapered surface, i.e. a surface over which the diameter of the work increases as the tool progresses on its longitudinal feed. The slide 11 is displaced leftward (see FIG. 9), i.e. the direction reverse from that of arrow f'. The shoe 140 frictionally engaging the slide has its stop 143b in engagement with bracket 142 and the actuator button of microswitch 144 is depressed, so that the energizing coil 154 for the brake 153 acting on shaft 87 is cut off and the brake released. Shaft 87 and hence shaft 82 coupled to it through dog clutch 94 is freely rotatable. As the slide 11 recedes, the rack 84 thereon rotates gear 83 and through friction clutch 151 rotates the gear 81 serving to connect carriage 6 to the longitudinal feed control lead screw 29. As a result, the cutting velocity of the tool in the work corresponds to the preselected base feed rate minus the crossfeed rate, as explained in detail for the first embodiment.

Assume next that the feeler reaches an inwardly tapered portion on the pattern contour, i.e. with the radius of the workpiece diminishing as the feed progresses, then slide 11 starts to advance in the direction of arrow f' (FIG. 9) and drives shoe 140 so that stop 143a engages bracket 142. This very slight relative displacement between the slide and shoe is sufficient to release the actuator button of microswitch 144, thereby closing the energizing circuit for electromagnetic brake 153, which is applied coupling shaft 87 and hence shaft 82 with carriage 6. Thereafter the longitudinal feed displacement of the carriage will be performed in direct response to the signals from the feeler without the benefit of any compensating action from the system including the gears meshing with the racks 84 and 29, since such compensating action, if effected, would be in a reverse direction from that desired. Throughout the cutting of the inwardly-tapering portion of the work contour, the slide 11 is therefore acting to rotate the gear 83, while overcoming the torque developed by the friction clutch 151 coupling it to shaft 87.

Should the next portion of the pattern contour be straight cylindrical, the crossfeed rate becomes zero and the shoe 140 retains its former position, retaining microswitch 144 in its released position. This is satisfactory since no compensation of the longitudinal feed rate is required. However, should the switch 144 be in its depressed position, as owing to a minute accidental displacement of slide shoe 140, or in the case the cylindrical portion of the contour follows an outwardly tapered portion, then the resulting operation also is satisfactory, since the crossfeed rate is zero at this time and the compensating system will therefore not produce any effective action.

If the cylindrical contour portion is followed by an outwardly tapered one, the compensating system will immediately resume effective operation as explained above.

Manual closure of switch 156 will cancel the influence of any displacements of slide 11 on the feed rate of the carriage since gear 81 is blocked relatively to carriage 6, and the compensating action of the feed rate is thus suppressed. This condition is useful in producing rapid displacements of the slide in either direction whenever desired, as earlier explained. Closure of switch 90 to energize solenoid 92 and release dog clutch 94 will release shaft 82 and gear 81, so that the carriage will be rapidly advanced. If switch 77 is closed then the carriage will be rapidly returned.

It will be understood that various modifications may be made in the embodiments illustrated and described without departing from the scope of the invention. Thus, if manual positional adjustment of the carriage relative to the bench is not desired, the screw 84 (FIGS. 1 and 2) provided with handwheel 86 and mounted on the slide, may be replaced by a simple rack secured to the slide. Various other modifications will occur to those familiar with the art.

What is claimed is:

1. In a templet controlled machine tool: longitudinal guideways, a carriage hydraulically reciprocable on said guideways, a tool slide supported by said carriage and hydraulically reciprocable substantially at right angles to said guideways, a first worm gear extending parallel with said guideways, a second worm gear supported by said tool slide and positioned so as to extend substantially at right angles to said guideways, two worm-wheels supported by said carriage, one of said worm-wheels being in meshing engagement with said first worm gear and the other worm-wheel being in meshing engagement with said second worm gear, a drive connection between said two worm-wheels, a first valve control system for said carriage including a valve member movable from a neutral position in opposite directions, said movable valve member being connected to one of said two worm gears, means for rotating said first worm gear in a selected direction at a selected substantially constant speed for selectively causing said two worm-wheels to rotate and said one worm gear to react against the worm-wheel in meshing engagement therewith as long as the other worm gear remains stationary to thereby shift said valve member from said neutral position thereof until said carriage moves in such a direction and at such speed as to selectively prevent said rotation of the two worm-wheels and said reaction of said one worm gear, a second valve control system for said tool slide and including a valve member movable from a neutral position in opposite directions, and a feeler member carried by said tool slide and adapted to trace a templet, said feeler member being connected to the movable valve member of said second valve control system whereby the movable valve member of said first valve control system will be adjusted in accordance with the movements of said carriage and in accordance with the movements of said tool slide relative to said carriage as controlled by said feeler member.

2. In a templet controlled machine tool including a hydraulically reciprocable carriage and a hydraulically reciprocable cross slide, a rotatable and longitudinally shiftable lead screw, a worm gear positioned on said cross slide so as to extend transversely of said lead screw, a first worm-wheel in meshing engagement with said lead screw, a second worm-wheel in meshing engagement with said worm gear, said first worm-wheel and said second worm-wheel being translatable with said carrier relative to said lead screw, a drive connection between said first worm-wheel and said second worm-wheel for being selectively effective to rotate said first worm-wheel from said second worm-wheel as said worm gear is moved with said cross slide relative to said carriage and to lock said first worm-wheel against rotation by reaction of the second worm-wheel against said worm gear as long as the latter remains stationary, a clutch interposed in said drive connection, a first valve control system for said carriage comprising a valve member slidable from a neutral position in opposite directions and connected to one end of said lead screw, means for rotating said lead screw in a selected direction at a selected substantially constant speed whereby to move said valve member longitudinally relative to said first worm-wheel until the latter is translated in locked condition in such a direction and at such a speed as to stop said longitudinal movement of the valve member, a second valve control system for said cross slide comprising a valve member movable from a neutral position in opposite directions, and a feeler member carried by said cross slide and adapted to trace a templet, said feeler member being connected to the movable valve member of said second valve control system whereby said first worm-wheel will be rotated through said worm gear and said second worm-wheel to adjust the movable valve member of said first valve control system in accordance with movement of said cross slide caused by said feeler member.

3. The machine tool claimed in claim 2, including means for selectively blocking and releasing the said first worm-wheel meshing with the lead screw to and from the carriage, and means enabling the said second worm-wheel to be rotated by said worm gear upon movement of the cross slide both in the blocked and released conditions of the first worm-wheel.

4. The machine tool claimed in claim 3, including means responsive to the direction of movement of the cross slide transversely of said carriage, and connected with the selective blocking means for automatically blocking said first worm-wheel to said carriage upon movement of the cross slide in one direction and releasing said first worm-wheel from said carriage upon movement of the cross slide in the opposite direction.

5. In a templet controlled machine tool including a hydraulically reciprocable carriage and a hydraulically reciprocable cross slide, a rotatable lead screw, a rack member slidably mounted on said cross slide and extending transversely of said lead screw, a worm-wheel in meshing engagement with said lead screw, a pinion in meshing engagement with said rack, said worm-wheel and said pinion being translatable with said carriage relative to said lead screw, a drive connection between said worm-wheel and said pinion effective to rotate said pinion from said worm-wheel as said lead screw is rotated and said carriage remains stationary, a first valve control system for said carriage comprising a valve member positioned in a valve casing formed in said cross slide, said valve member and said valve casing being movable relative to each other from a neutral position in opposite directions, means for connecting said rack member to said movable valve member, means for rotating said lead screw in a selected direction at a selected substantially constant speed whereby to move said valve member longitudinally relative to said pinion until said worm-wheel is translated in such a direction and at such a speed as to stop said longitudinal movement of the valve member, and a feeler member carried by said cross slide and adapted to trace a templet, said feeler member controlling the movements of said cross slide relative to said carriage whereby to adjust the position of said valve casing relative to the position of said valve member in accordance with the control action of said feeler member.

References Cited by the Examiner

FOREIGN PATENTS 177,035 12/53 Austria.
959,874 3/57 Germany.

ANDREW R. JUHASZ, *Primary Examiner.*

LEON PEAR, *Examiner.*